March 22, 1927.
J. J. COMERFORD
THERMOSTATIC ALARM
Filed Dec. 8, 1925
1,621,628
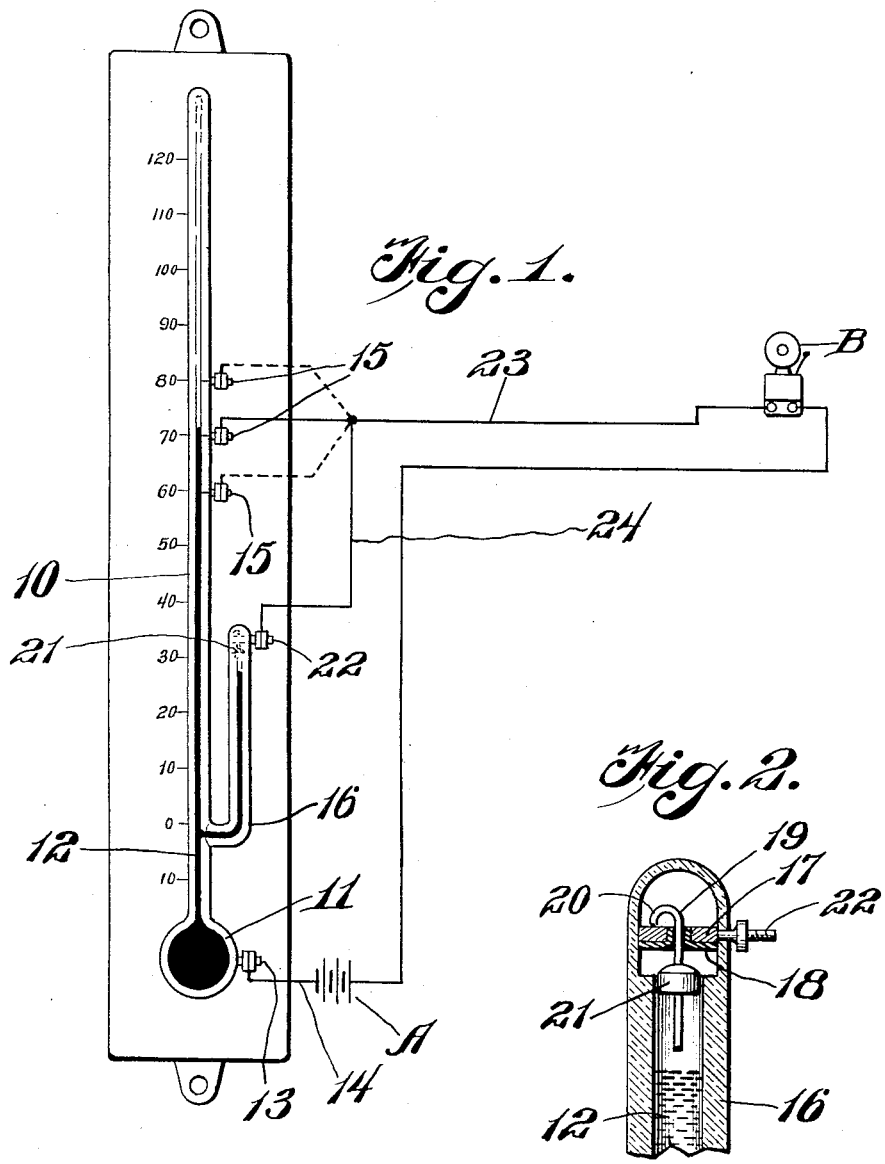
Inventor
John J. Comerford
By Watson E. Coleman
Attorney Patented Mar. 22, 1927.

1,621,628

UNITED STATES PATENT OFFICE.

JOHN J. COMERFORD, OF PHILADELPHIA, PENNSYLVANIA, ASSIGNOR OF ONE-THIRD TO MICHAEL J. MARTLEY, OF BRONXVILLE, NEW YORK, AND ONE-THIRD TO HARRY BYRNE, OF NEW YORK, N. Y.

THERMOSTATIC ALARM.

Application filed December 8, 1925. Serial No. 74,197.

This invention relates to thermostatic alarms, and particularly to that class of alarms in which a thermometer is provided with contact points with which the mercury makes electrical connection as the mercury rises or falls.

The general object of my invention is to provide a device of this character which will not only cause the ringing of the alarm when the mercury rises in the thermometer to a predetermined point but which will also cause the sounding of an alarm when the mercury falls below a predetermined point.

A further object is to provide means whereby the circuit may be adjusted so that an alarm will be sounded when the mercury rises to any previously selected point in the thermometer.

My invention is illustrated in the accompanying drawing, wherein:—

Figure 1 is a face view of the thermometer showing the circuits leading therefrom diagrammatically;

Figure 2 is an enlarged sectional view of the upper portion of the branch of the thermometer.

Referring to this drawing, 10 designates a thermometer tube of any usual or suitable construction and 11 the bulb thereof, this thermometer having the mercury 12 and having at one side adjacent the lower end of the tube 10 the metallic contact member 13 which extends through the tube and is in constant contact with the mercury and extends out of the tube and is adapted to be connected, as by means of a binding screw 14, in circuit with a signal or other device, as will be later described. Disposed at intervals along the tube 10 adjacent the upper portion of the tube 10 are a plurality of contact points 15 disposed in vertical series, each contact point having a binding screw or other means whereby it may be connected to a circuit wire.

Extending from the lower portion of the tube 10 is a branch 16 which extends outward and then upward and the upper end of this branch carries within it an annular member 17 which is illustrated as being of metal but insulated upon its lower face, as at 18, and having the wall of its central opening insulated. Disposed within this opening is a metallic shank 19, the upper end of which is curved laterally and downwardly, as at 20, and the lower end of this shank below the member 17 carries a float 21. A conductor 22 extends through the wall of the branch 16 and is connected to the metallic annulus 17.

The operation of this portion of the device will be obvious. The mercury under normal circumstances stands at such height within this branch that the float 21 is lifted and the hook portion 20 is out of contact with the metallic ring 17. If the mercury falls below normal or below the predetermined degree at which an alarm is to be sounded, the float 21 will then lower and the hook portion 20 will rest upon the ring 17 and an electrical connection will be made between the mercury in the branch 16, said shank 19 the ring 20 and the conductor 22, thus causing the sounding of an alarm or the actuation of some other electrically actuated mechanism.

I have illustrated the conductor or contact 13 as being connected to a battery A and to a signal B and one of the contact points 15 as being connected by a wire 23 to this signal. I have also illustrated the conductor 22 as being connected to the signal by a wire 24. Obviously now when the mercury rises within the tube 10 and reaches the contact points 15 to which the wire 23 is connected, a circuit will be completed from the battery, through the mercury, through the wire 23 to the signal B, back to the battery, and the signal will be sounded, calling attention to the fact that the temperature has risen unduly. If, on the contrary, the mercury should drop below the predetermined level, the float 21 will drop and the circuit will be again completed through the signal B. When the mercury rises in the tube 10, it also rises, of course, in the branch 16 and the float rises and closes the central opening through the member 17 so as to prevent the discharge of mercury therethrough.

While I have illustrated this thermometer as being connected to a bell, I wish it understood that this bell is purely illustrative and that it may be connected in circuit with any electrically actuated mechanism whereby to close a circuit when the mercury rises to a predetermined point or falls to a predetermined point.

I claim:—

1. A thermostatic control of the character described including a thermometer having a tube, the tube being provided with a contact point disposed in the upper end of the tube and with which the mercury is adapted to engage when the mercury rises to a predetermined point and also having a contact point adjacent the lower portion of the tube with which the mercury is at all times in electrical engagement, said contact points having binding screws, the tube having an upwardly extending branch extending from the lower portion of the tube, and means within this branch actuated by the falling of the mercury in the branch adapted to close a circuit through the said electrically actuated means.

2. A thermostatic control of the character described including a thermometer having a tube, the tube being provided with a contact point disposed in the upper end of the tube and with which the mercury is adapted to engage when the mercury rises to a predetermined point and also having a contact point adjacent the lower portion of the tube with which the mercury is at all times in electrical engagement, said contact points having conductor connecting means, the tube having an upwardly extending branch, a metallic member disposed in said branch and having its lower face insulated, a float, a shank mounted on the float and extending above said metallic member and adapted to come in electrical engagement therewith when the float falls, and a conductor attached to said metallic member and extending out through the wall of the branch and adapted to be engaged in circuit with said electrical device.

3. A thermostatic control of the character described including a thermometer having a tube, the tube being provided with a plurality of vertical spaced contact points disposed in the upper end of the tube and with which the mercury is adapted to engage as the mercury rises and also having a contact point adjacent the lower portion of the tube with which the mercury is at all times in electrical engagement, said contact points having conductor connections, the tube having an upwardly extending branch, an annular metallic member disposed in said branch and having its under surface and the wall of its central opening insulated, a float disposed below the metallic member and having a shank extending upward through said central opening and then extending downward, and there being a conductor extending out through the wall of the branch and connected to said metallic member.

JOHN J. COMERFORD.